United States Patent
Liu et al.

(10) Patent No.: US 12,395,385 B2
(45) Date of Patent: Aug. 19, 2025

(54) DATA TRANSMISSION METHOD AND DEVICE, CHIP SYSTEM, AND COMPUTER-READABLE STORAGE MEDIUM

(71) Applicant: HUAWEI TECHNOLOGIES CO., LTD., GuangDong (CN)

(72) Inventors: Chenchen Liu, Shenzhen (CN); Dandan Liang, Shenzhen (CN); Jian Yu, Shenzhen (CN); Ming Gan, Shenzhen (CN); Meihong Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 17/975,884

(22) Filed: Oct. 28, 2022

(65) Prior Publication Data

US 2023/0064452 A1  Mar. 2, 2023

Related U.S. Application Data

(63) Continuation of application No. PCT/CN2021/080305, filed on Mar. 11, 2021.

(30) Foreign Application Priority Data

Apr. 29, 2020  (CN) .......................... 202010357932.7

(51) Int. Cl.
*H04B 1/38* (2015.01)
*H04L 5/00* (2006.01)
(Continued)

(52) U.S. Cl.
CPC ...... *H04L 25/03866* (2013.01); *H04L 5/0044* (2013.01); *H04L 27/2601* (2013.01)

(58) Field of Classification Search
CPC ............. H04L 25/03866; H04L 5/0044; H04L 27/2601; H04L 5/026; H04W 74/0816
(Continued)

(56) References Cited

U.S. PATENT DOCUMENTS

| | | | |
|---|---|---|---|
| 2003/0145196 A1* | 7/2003 | Heegard | H04L 5/026 713/150 |
| 2019/0132879 A1* | 5/2019 | Chen | H04W 74/0816 |

FOREIGN PATENT DOCUMENTS

| | | |
|---|---|---|
| CN | 103746776 A | 4/2014 |
| CN | 103986684 A | 8/2014 |

(Continued)

OTHER PUBLICATIONS

Xiaogang Chen, et al., "EHT PPDU Scrambler," IEEE 802.11-20/0563r1, Mar. 25, 2020; 16 total pages.
(Continued)

*Primary Examiner* — Phuong Phu
(74) *Attorney, Agent, or Firm* — Rimon PC

(57) ABSTRACT

This application discloses a data transmission method that includes: scrambling to-be-transmitted data, to obtain scrambled data; and sending the scrambled data to a receive device. The initialization bits of a scrambler used to scramble the data include a first bit sequence and a second bit sequence. The first bit sequence is carried in a service field of the to-be-transmitted data, the second bit sequence reuses a bit in a signal field of a physical layer protocol data unit (PPDU), and the quantity of the initialization bits is equal to the order of the scrambler. In embodiments of this application, when the transmit device and the receive device use the scrambler with a higher order than that in the conventional technology, the initialization bits of the scrambler are based on bits in an existing service field used for data scrambling and reused bits in some signal fields.

10 Claims, 9 Drawing Sheets

(51) Int. Cl.
  *H04L 5/16*   (2006.01)
  *H04L 25/03*  (2006.01)
  *H04L 27/26*  (2006.01)

(58) Field of Classification Search
  USPC .................. 375/219, 220, 222, 295, 316
  See application file for complete search history.

(56) References Cited

FOREIGN PATENT DOCUMENTS

CN      106954273 A    7/2017
WO    2017005049 A1    1/2017

OTHER PUBLICATIONS

Dr Houman Zarrinkoub, "Understanding LTE with MATLAB—From Mathematical modeling to simulation and prototyping." 2014; 16 total pages.

Mercodia Developing diagnostics, "Mercodia Glucagon ELISA 10μL," 10-1281-01 Reagents For 96 DETERMINATIONS, For Research Use Only, Manufactured by Mercodia AB, Sylveniusgatan 8A, SE-754 50 Uppsala, Sweden, (2016) 12 total pages.

Sridhar Rajagopal et al., (Samsun Electronics), "Project: IEEE P802.15 Working Group for Wireless Personal Area Networks (WPANs)," Submission Title: "Use of scrambler and FEC for VLC," Oct. 28, 2009; 11 total pages.

\* cited by examiner

FIG. 8

| Data (Data) (STA 1) | Data (Data) (STA 2) | ... | Data (Data) (STA N) |
|---|---|---|---|
| Service field | Service field | | Service field |
| Extremely high throughput long training field (EHT-LTF) | Extremely high throughput long training field (EHT-LTF) | | Extremely high throughput long training field (EHT-LTF) |
| Extremely high throughput short training field (EHT-STF) | Extremely high throughput short training field (EHT-STF) | | Extremely high throughput short training field (EHT-STF) |

Universal signal field (U-SIG)

Repeated legacy signal field (RL-SIG)

Legacy signal field (L-SIG)

Legacy long training field (L-LTF)

Legacy short training field (L-STF)

DATA TRANSMISSION METHOD AND DEVICE, CHIP SYSTEM, AND COMPUTER-READABLE STORAGE MEDIUM

CROSS-REFERENCE TO RELATED APPLICATIONS

This application is a continuation of International Application No. PCT/CN2021/080305, filed on Mar. 11, 2021, which claims priority to Chinese Patent Application No. 202010357932.7, filed on Apr. 29, 2020. The disclosures of the aforementioned applications are hereby incorporated by reference in their entireties.

TECHNICAL FIELD

This application relates generally to the field of communications technologies, and in particular, to a data transmission method and device, a chip system, and a computer-readable storage medium.

BACKGROUND

In a communications system, a transmit device transmits information to a receive device in the form of a bit stream, and the bit stream consists of "0" and "1". To facilitate extraction of clock signals from line signals, long 0s and long 1s need to be avoided. The transmit device usually performs an XOR operation on an information bit stream to be sent and a pseudo-random sequence, and encodes and sends the result obtained after the XOR operation. After decoding the received bit stream, the receive device performs an XOR operation on the decoded bit stream and the same pseudo-random sequence, to restore the original information bit stream. At the same time, after the XOR operation is performed on the original information bit stream and the pseudo-random sequence, the original information bit stream may also be encrypted. The XOR operation performed by the transmit device on the original information stream and the pseudo-random sequence is referred to as scrambling. The pseudo-random sequence used is referred to as a scrambling code sequence. A device that generates the scrambling code sequence is referred to as a scrambler. The process in which the receive device restores the original information bit stream from the scrambled sequence is referred to as descrambling.

An orthogonal frequency division multiplexing (OFDM) symbol is formed by superposing a plurality of independently modulated subcarrier signals. Therefore, when the phases of the subcarriers are the same or similar, the superposed signals are modulated by signals with the same initial phase, to generate a large instantaneous power peak, and results in a high peak to average power ratio (PAPR). Because a common power amplifier has a limited dynamic range, signals with a large peak-to-average ratio are likely to enter anon-linear area of the power amplifier. This causes non-linear distortion of the signals, obvious spectrum spreading interference and in-band signal distortion, and severe deterioration of entire system performance. A high PAPR has become a major technical obstacle to the OFDM. Therefore, a scrambling technology is applied to an OFDM communications system, to reduce the PAPR of the system.

Scrambling codes are usually generated by using a cyclic shift register. FIG. 1 shows a typical structure.

$g_i$(i=0, 1, m) is a weighting coefficient, and its value is 1 or 0. $g_0$ and $g_m$ usually have a fixed value of 1. m is an order of a cyclic shift register. A higher order indicates a longer non-repeated sequence that can be generated. A method for generating a sequence of the cyclic shift register is as follows:

1. Initialize values of m registers: x(1), x(2), . . . , x(m).
2. Calculate an output bit according to the following formula:

out=mod($\Sigma_{i=1}^{m} g_i x(i)$,2), where mod(*,2) indicates a modulo operation on 2.

3. Update values of m shift registers in the following manner:

x(m)=x(m−1),x(m−1)=x(m−2), . . . ,x(2)=x(1),x(1)=out

The foregoing process is cyclically repeated, and the generated output bits are aggregated to form a scrambling code sequence. After the foregoing update process is repeated for a specific quantity of times, the output sequence shows a repeated output result, and a length of a longest non-repeated sequence that can be generated by a scrambler is not greater than $2^m - 1$.

One scrambler may also be indicated by one generator polynomial. The scrambler in FIG. 1 may be described by using the following generator polynomial:

$$G(X) = \sum_{i=0}^{m} g_i X^i$$

The Wireless Fidelity (Wi-Fi) standard has always used a scrambler structure shown in FIG. 2 since the 802.11a standard. The scrambler includes seven registers, corresponding to X1, X2, . . . , and X7, in other words, an order m of the scrambler is 7. Therefore, the length of the longest non-repeated sequence that can be generated by the scrambler is 127. A Wi-Fi device performs an XOR operation on an original information bit stream and the periodic sequence at the transmit end, and encodes and sends an XOR result.

Although the scrambling code sequence with a cycle of 127 may be determined in FIG. 2, a start location (also referred to as a phase of the scrambler) of the scrambling code sequence further needs to be determined by an initial state of the shift register in the scrambler. In addition, the receive device needs to learn of an initial state of the scrambler to generate a scrambling code sequence that is the same as that of the transmit end, to restore the original information bit stream.

To enable the receive device to learn of the initial state of the scrambler, a 16-bit service field is defined in the Wi-Fi standard, as shown in Table 1.

TABLE 1

| Service field | | |
|---|---|---|
| Bits | Field | Description |
| B0 to B6 | Scrambler initialization | Set to 0 before scrambling |
| B7 to B15 | Reserved | Reserved |

First 7 bits in the service field are the initialization bits of the scrambler, used to be synchronized with a descrambler. The initialization bits of the scrambler may be set to "0", to help estimate an initial state of the scrambler of the receive device. Remaining 9 bits in the service field are reserved service bits, and may also be set to "0". A transmission order may be from a low bit 0 to a high bit 15.

In an existing standard, a 127-bit frame synchronization scrambler with generator polynomial $G(X)=X^7+X^4+1$ may be used. If the initial states of the scrambler are all 1, a 127-bit sequence repeatedly generated by the scrambler may be 00001110, 11110010, 11001001, 00000010, 00100110, 00101110, 10110110, 00001100, 11010100, 11100111, 10110100, 00101010, 11111010, 01010001, 10111000, and 1111111. During transmission, an initial state of a scrambler of each group is actually randomly set to a non-zero state.

The transmit device and the receive device use the same scrambler with a generator polynomial by default, and working principles of the two devices are as follows.

The scrambling process of the transmit device: In each data packet transmission, the scrambler randomly selects one non-zero initial state, in other words, the initial state corresponds to initial bit values of the seven registers. The scrambler cyclically generates 127 bits, performs XOR on a continuously repeated 127-bit sequence and input data bits, and outputs scrambled data bits. Finally, the scrambled data bits are sent.

The descrambling process of the receive device: When receiving the scrambled data bits, the receive device obtains, based on first 7 bits in the scrambled data bits and first 7 bits in the input data bits of the scrambler, first 7 bits of the 127-bit sequence cyclically generated by the scrambler. Further, the initial state of the scrambler is deduced based on the first 7 bits of the 127-bit sequence and the generator polynomial of the scrambler. After obtaining the initial state of the scrambler, the receive device may repeatedly generate 127 bits, and perform XOR on the 127 bits and the scrambled data bits, to obtain the original data bits before scrambling.

A prerequisite for correct descrambling by the receive device is that the receive device knows the first 7 bits of an input data sequence of the scrambler. In an existing method, first 7 data bits of a sequence of the transmit device are set as a known sequence are all set to 0, and are put in a service field of a data field. In other words, the first 7 input data bits of the scrambler are referred to as the initialization bits of the scrambler.

With the scrambler, a transmitted bit stream becomes more random, and long consecutive 0s or 1s do not exist. In addition, original information is encrypted, avoiding plaintext transmission. In addition, due to randomness of a scrambled bit stream, same information or a periodic signal is not transmitted on all subcarriers of one OFDM symbol in an OFDM system, so that the PAPR of the OFDM system is reduced.

In the next generation Wi-Fi standard, a channel bandwidth is upgraded from 160 MHz to 320 MHz, and higher-order modulation, such as 4096-quadrature amplitude modulation (QAM), may be introduced. In an existing 127-bit scrambling code sequence, a periodic signal may repeatedly occur in one OFDM symbol, and therefore the PAPR of a transmitted signal is very large.

A higher-order scrambler can generate a longer non-repeated sequence, avoiding repeated occurrence of a periodic signal in one OFDM symbol. However, the higher-order scrambler requires longer initialization bit information, which definitely increases system overhead.

Therefore, providing a scrambler that can generate a longer non-repeated sequence without increasing the system overhead is an urgent technical problem to be resolved.

SUMMARY

Embodiments of this application provide a data transmission method, a transmit device, a receive device, a chip system, and a computer-readable storage medium. A higher-order scrambler, designed based on a bandwidth and a modulation order, can replace some initialization bits of the scrambler with bits in a signal field. This can reduce system overheads caused by a long initialization bit, and generate a longer non-repeated scrambling code sequence, to avoid repeated occurrence of a periodic signal in one OFDM symbol and reduce the PAPR of a system.

According to a first aspect, this application provides a data transmission method, including:
 scrambling to-be-transmitted data to obtain scrambled data; and
 sending the scrambled data to a receive device.

The initialization bits of a scrambler used to scramble the data include a first bit sequence and a second bit sequence. The first bit sequence is carried in a service field of the to-be-transmitted data, the second bit sequence reuses a bit in a signal field, and the quantity of the initialization bits is equal to the order of the scrambler.

According to a second aspect, this application provides a transmit device, including:
 a processor, configured to scramble to-be-transmitted data, to obtain scrambled data; and
 a transceiver, configured to send the scrambled data to a receive device.

The initialization bits of a scrambler used to scramble the data include a first bit sequence and a second bit sequence. The first bit sequence is carried in a service field of the to-be-transmitted data, the second bit sequence reuses a bit in a signal field, and the quantity of the initialization bits is equal to the order of the scrambler.

In the data transmission method provided in the first aspect of this application or the transmit device provided in the second aspect, when the transmit device and the receive device use the scrambler with a higher order than that in the conventional technology, the initialization bits of the scrambler are based on bits in an existing service field used for data scrambling and reused bits in some signal fields. In this way, the PAPR is reduced without increasing the overhead of the service field, and the network throughput is improved.

In the data transmission method provided in the first aspect of this application or the transmit device provided in the second aspect, in a first implementation, the order of the scrambler corresponds to at least one of a resource unit size and a modulation and coding scheme.

In the data transmission method provided in the first aspect of this application or the transmit device provided in the second aspect, in a second implementation, the second bit sequence reuses bits that are in the signal field and that correspond to at least one type of indication information indicating a channel bandwidth (channel width), a modulation and coding scheme (MCS), an association identifier (AID), or a basic service set (BSS).

The first bit sequence may be bits or a combination thereof used to indicate the channel bandwidth, the MCS, the AID, and the BSS. An order of sending such bits is not limited, provided that the transmit device and the receive device perform as agreed.

In the data transmission method provided in the first aspect of this application or the transmit device provided in the second aspect, in a third implementation, the first bit sequence is 7 bits and is carried in first 7 bits in the service field. Optionally, the first bit sequence is set to 0 before the data is scrambled.

According to the data transmission method provided in the first aspect of this application or the transmit device provided in the second aspect, in a fourth implementation, 9 bits in the service field other than the first 7 bits are set as parity check bits of a signal field in a physical layer protocol data unit (PPDU).

According to a third aspect, this application provides a data transmission method, including:

scrambling to-be-transmitted data to obtain scrambled data; and sending the scrambled data to a receive device.

An order of a scrambler used to scramble the data corresponds to at least one of a resource unit size and a modulation and coding scheme.

According to a fourth aspect, this application provides a transmit device, including:

a processor, configured to scramble to-be-transmitted data, to obtain scrambled data; and a transceiver, configured to send the scrambled data to a receive device.

An order of a scrambler used to scramble the data corresponds to at least one of a resource unit size and a modulation and coding scheme.

In the data transmission method provided in the third aspect of this application or the transmit device provided in the fourth aspect, in a first implementation, the scrambler used to scramble the data is a higher order and lower order integrated scrambler.

According to the method provided in the third aspect and the transmit device provided in the fourth aspect of this application, the scrambler used to scramble the data is a scrambler supporting different orders. A scrambler with a specific order is selected, based on at least one of bandwidth and modulation and coding index information, to scramble the data. The scrambler is compatible with a scrambler structure of a conventional Wi-Fi system, and a device vendor can design scramblers of different complexity based on different scenario requirements.

In the data transmission method provided in the third aspect of this application or the transmit device provided in the fourth aspect, in a second implementation, the initialization bits of the scrambler used to scramble the data include a first bit sequence and a second bit sequence. The first bit sequence is carried in a service field of the to-be-transmitted data, the second bit sequence reuses a bit in a signal field, and the quantity of the initialization bits is equal to the order of the scrambler.

In the data transmission method provided in the third aspect of this application or the transmit device provided in the fourth aspect, in a third implementation, the second bit sequence reuses bits that are in the signal field and that correspond to at least one type of indication information indicating a channel bandwidth, a modulation and coding scheme, an association identifier, or a basic service set.

In the data transmission method provided in the third aspect of this application or the transmit device provided in the fourth aspect, in a fourth implementation, the first bit sequence is 7 bits and is carried in first 7 bits in the service field. The first bit sequence is set to 0 before the data is scrambled.

In the data transmission method provided in the third aspect of this application or the transmit device provided in the fourth aspect, in a fifth implementation, 9 bits in the service field other than the first 7 bits are set as parity check bits in a signal field of a physical layer protocol data unit (PPDU).

According to a fifth aspect, this application provides a data transmission method, including:

receiving scrambled data; and descrambling the scrambled data, to obtain descrambled data.

The initialization bits of a scrambler used to descramble the data include a first bit sequence and a second bit sequence. The first bit sequence is 7 bits and is carried in first 7 bits in a service field of the data. The second bit sequence reuses a bit in a signal field. The quantity of the initialization bits is equal to the order of the scrambler.

According to a sixth aspect, this application provides a receive device, including:

a transceiver, configured to receive scrambled data; and a processor, configured to descramble the scrambled data, to obtain descrambled data.

The initialization bits of a scrambler used to descramble the data include a first bit sequence and a second bit sequence. The first bit sequence is carried in a service field of the data, the second bit sequence reuses a bit in a signal field, and the quantity of the initialization bits is equal to the order of the scrambler.

The first bit sequence may be bits or a combination thereof used to indicate the channel bandwidth, the MCS, the AID, and the BSS. An order of sending such bits is not limited, provided that the transmit device and the receive device perform as agreed.

In the data transmission method provided in the fifth aspect of this application or the receive device provided in the sixth aspect, when the transmit device and the receive device use the scrambler with a higher order than that in the conventional technology, the initialization bits of the scrambler are based on bits in an existing service field used for data scrambling and reused bits in some signal fields. In this way, the PAPR is reduced without increasing the overhead of the service field, and the network throughput is improved.

In the data transmission method provided in the fifth aspect of this application or the receive device provided in the sixth aspect, in a first implementation, the order of the scrambler corresponds to at least one of a resource unit size and a modulation and coding scheme.

In the data transmission method provided in the fifth aspect of this application or the receive device provided in the sixth aspect, in a second implementation, the second bit sequence reuses bits that are in the signal field and that correspond to at least one type of indication information indicating a channel bandwidth, a modulation and coding scheme, an association identifier, or a basic service set.

In the data transmission method provided in the fifth aspect of this application or the receive device provided in the sixth aspect, in a third implementation, the first bit sequence is 7 bits and is carried in first 7 bits in the service field. 9 bits in the service field other than the first 7 bits are set as parity check bits in a signal field of a physical layer protocol data unit (PPDU).

According to a seventh aspect, this application provides a data transmission method, including:

receiving scrambled data; and descrambling the scrambled data, to obtain descrambled data.

An order of a scrambler used to descramble the data corresponds to at least one of a resource unit size and a modulation and coding scheme.

According to an eighth aspect, this application provides a receive device, including:

a transceiver, configured to receive scrambled data; and a processor, configured to descramble the scrambled data, to obtain descrambled data.

An order of a scrambler used to descramble the data corresponds to at least one of a resource unit size and a modulation and coding scheme.

In the data transmission method provided in the seventh aspect of this application or the receive device provided in the eighth aspect, in a first implementation, the scrambler used to descramble the data is a higher order and lower order integrated scrambler.

In the data transmission method provided in the seventh aspect of this application or the receive device provided in the eighth aspect, in a second implementation, the initialization bits of the scrambler used to descramble the data include a first bit sequence and a second bit sequence. The first bit sequence is carried in a service field of the data, the second bit sequence reuses a bit in a signal field, and the quantity of the initialization bits is equal to the order of the scrambler.

In the data transmission method provided in the seventh aspect of this application or the receive device provided in the eighth aspect, in a third implementation, the second bit sequence reuses bits that are in the signal field and that correspond to at least one type of indication information indicating a channel bandwidth, a modulation and coding scheme, an association identifier, or a basic service set.

In the data transmission method provided in the seventh aspect of this application or the receive device provided in the eighth aspect, in a fourth implementation, the first bit sequence is 7 bits and is carried in first 7 bits in the service field. 9 bits in the service field other than the first 7 bits are set as parity check bits in a signal field in a physical layer protocol data unit (PPDU).

According to a ninth aspect, this application provides a chip system, including at least one processor, an interface, and a memory coupled to the processor. When the processor executes a computer program stored in the memory, the method in any one of the first aspect, the third aspect, the fourth aspect, the fifth aspect, and the seventh aspect is implemented.

In a specific implementation process, the processor may be configured to perform, for example, but not limited to, baseband-related processing, and the transceiver may be configured to perform, for example, but not limited to, radio frequency sending and receiving. The foregoing components may be separately disposed on chips that are independent of each other, or at least a part or all of the components may be disposed on a same chip. For example, the processor may further be divided into an analog baseband processor and a digital baseband processor. The analog baseband processor and the transceiver may be integrated on a same chip, and the digital baseband processor may be disposed on an independent chip. With continuous development of integrated circuit technologies, more components can be integrated on a same chip. For example, the digital baseband processor and a plurality of application processors (for example, but not limited to, a graphics processor and a multimedia processor) may be integrated on a same chip. The chip may be referred to as a system on chip. Whether all the components are separately disposed on different chips or integrated and disposed on one or more chips usually depends on a specific requirement for a product design.

According to a tenth aspect, this application provides a computer-readable storage medium configured to store a computer program. When the computer program is executed, the method in any one of the first aspect, the third aspect, the fourth aspect, the fifth aspect, and the seventh aspect is implemented.

According to an eleventh aspect, this application provides a transmit device. The transmit device has some or all functions of the transmit device implementing the method examples in the first aspect and the third aspect. For example, functions of the transmit device may have some or all functions of embodiments of this application, or may have a function of independently implementing any embodiment in this application. The functions may be implemented by hardware, or may be implemented by hardware by executing corresponding software. The hardware or the software includes one or more units or modules corresponding to the functions.

In a possible design, a structure of the transmit device may include a processing unit and a communications unit. The processing unit is configured to support the transmit device in performing a corresponding function in the foregoing methods. The communications unit is configured to support communications between the transmit device and another device. The transmit device may further include a storage unit. The storage unit is configured to be coupled to the processing unit and a sending unit, and the storage unit stores program instructions and data that are necessary for the transmit device.

According to a twelfth aspect, this application provides a receive device. The receive device has some or all functions of the receive device implementing the method examples in the fifth aspect and the seventh aspect. For example, functions of the receive device may have some or all functions of embodiments of this application, or may have a function of independently implementing any embodiment in this application. The functions may be implemented by hardware, or may be implemented by hardware by executing corresponding software. The hardware or the software includes one or more units or modules corresponding to the functions.

In a possible design, a structure of the receive device may include a processing unit and a communications unit. The processing unit is configured to support the receive device in performing a corresponding function in the foregoing methods. The communications unit is configured to support communications between the receive device and another device. The receive device may further include a storage unit. The storage unit is configured to be coupled to the processing unit and a sending unit, and the storage unit stores program instructions and data that are necessary for the receive device.

According to a thirteenth aspect, this application provides a processor, configured to perform the method in any one of the first aspect, the third aspect, the fifth aspect, and the seventh aspect. In a process of performing these methods, a process of sending the foregoing information and a process of receiving the foregoing information in the foregoing methods may be understood as a process of outputting the foregoing information by the processor and a process of receiving the foregoing input information by the processor. Specifically, when outputting the information, the processor outputs the information to a transceiver, so that the transceiver transmits the information. Still further, after the information is output by the processor, other processing may further need to be performed on the information before the information arrives at the transceiver. Similarly, when the processor receives the input information, the transceiver receives the information and inputs the information into the processor. Still further, after the transceiver receives the information, other processing may need to be performed on the information before the information is input into the processor.

In this case, for operations such as transmission, sending, and receiving related to the processor, if there is no particular statement, or if the operations do not contradict an actual function or internal logic of the operations in related descriptions, the operations may be more generally understood as operations such as input, receiving, and output of the processor, instead of operations such as transmission, sending, and receiving directly performed by a radio frequency circuit and an antenna.

In a specific implementation process, the processor may be a processor specially configured to perform these methods, or a processor, for example, a general-purpose processor, that executes computer instructions in a memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in embodiments of the present invention.

According to a fourteenth aspect, this application provides a computer program product including instructions. When the computer program product runs on a computer, the computer is enabled to perform the method in any one of the first aspect, the third aspect, the fifth aspect, and the seventh aspect.

According to a fifteenth aspect, this application provides a functional entity, configured to perform the method in any one of the first aspect, the third aspect, the fifth aspect, and the seventh aspect.

According to a sixteenth aspect, this application provides a higher order and lower order integrated scrambler. The higher order and lower order integrated scrambler includes scramblers with different layers, such as a 7-order scrambler, an 11-order scrambler, and a 15-order scrambler.

According to a seventeenth aspect, this application provides three 17-order scramblers, one 18-order scrambler, and one 20-order scrambler.

BRIEF DESCRIPTION OF DRAWINGS

FIG. 8 is a schematic flowchart of sending a data packet based on a trigger frame according to an embodiment of this application;

DESCRIPTION OF EMBODIMENTS

The following further describes specific embodiments of this application in detail with reference to accompanying drawings.

Figure 1:
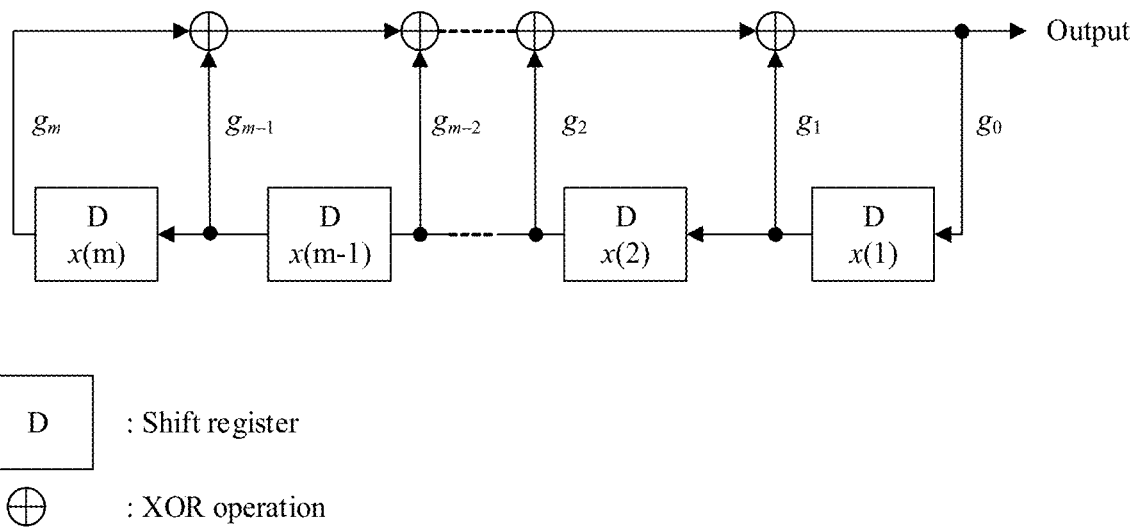
FIG. 1 is a schematic diagram of a structure of a cyclic shift register.
Figure 2:
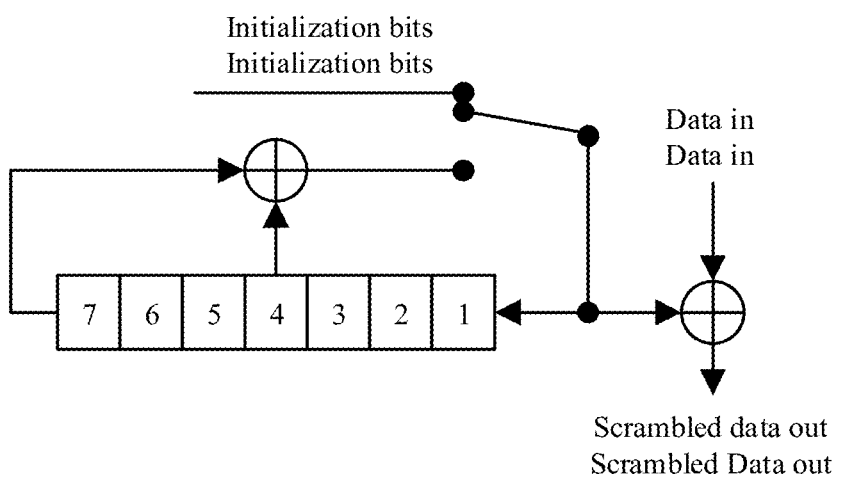
FIG. 2 is a schematic diagram of a structure of a 7-order scrambler.
Figure 3:
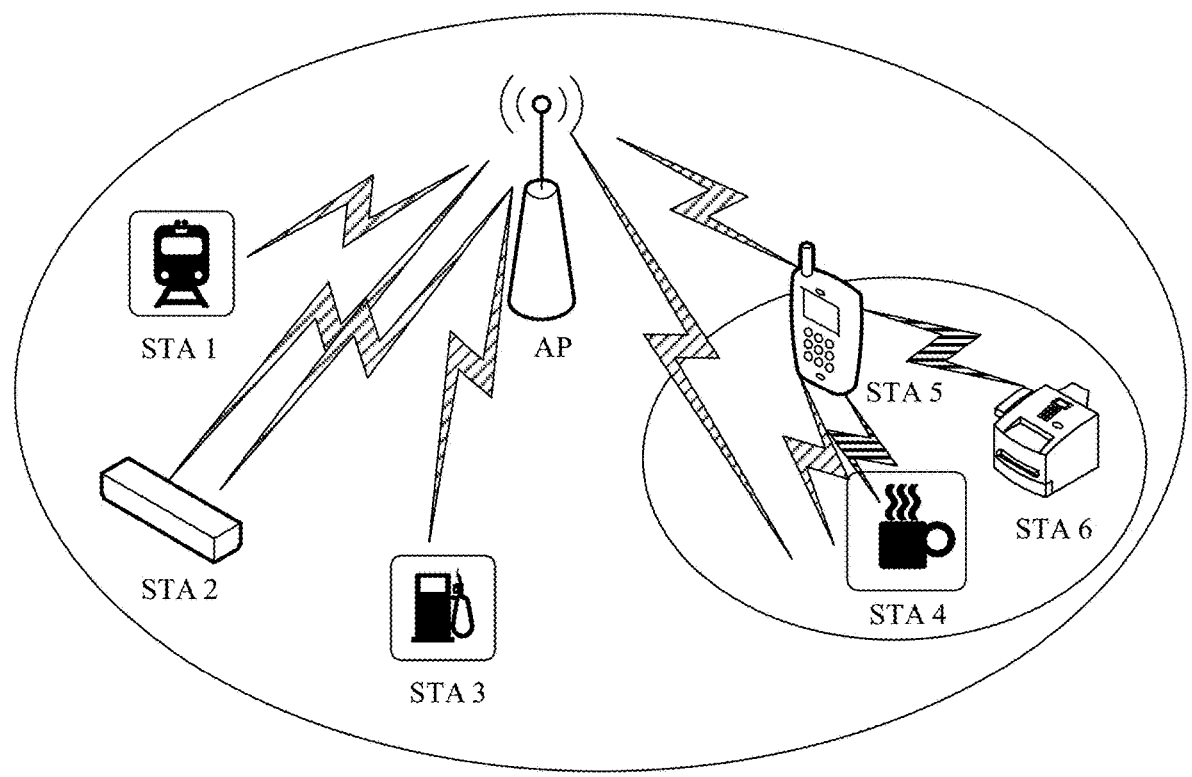
FIG. 3 is a schematic diagram of a network structure according to an embodiment of this application.

FIG. 3 is used as an example to describe a network structure to which a data transmission method in this application is applicable. FIG. 3 is a schematic diagram of a network structure according to an embodiment of this application. The network structure may include one or more access points (AP) stations and one or more non-access-point stations (non-AP STA). For ease of description, an access point station is referred to as an access point (AP), and a non-access point station is referred to as a station (STA) in this specification. In FIG. 1, the network structure including one AP and six stations (a STA 1, a STA 2, a STA 3, a STA 4, a STA 5, and a STA 6) is used as an example for description.

The access point may be an access point used by a terminal device (such as a mobile phone) to access a wired (or wireless) network, and is mainly deployed at home, in a building, and in a park. A typical coverage radius is tens of meters to hundreds of meters. Certainly, the access point may alternatively be deployed outdoors. The access point is equivalent to a bridge that connects the wired network and the wireless network. A main function of the access point is to connect various wireless network clients together and then connect the wireless network to the Ethernet. Specifically, the access point may be a terminal device (such as a mobile phone) or a network device (such as a router) with a wireless fidelity (Wi-Fi) chip. The access point may be a device that supports the 802.11be standard. Alternatively, the access point may be a device that supports a plurality of wireless local area network (WLAN) standards of the 802.11 family such as the 802.11ax standard, the 802.11ac standard, the 802.11n standard, the 802.11g standard, the 802.11b standard, and the 802.11a standard. The access point in this application may be a high efficiency (HE) AP or an extremely high throughput (EHT) AP, or may be an access point applicable to a future Wi-Fi standard.

The station may be a wireless communications chip, a wireless sensor, a wireless communications terminal, or the like, and may also be referred to as a user. For example, the station may be a mobile phone supporting a Wi-Fi communications function, a tablet computer supporting a Wi-Fi communications function, a set-top box supporting a Wi-Fi communications function, a smart television supporting a Wi-Fi communications function, an intelligent wearable device supporting a Wi-Fi communications function, a vehicle-mounted communications device supporting a Wi-Fi communications function, or a computer supporting a Wi-Fi communications function. Optionally, the station may support the 802.11be standard. The station may also support a plurality of wireless local area network (WLAN) standards of the 802.11 family such as 802.11be, 802.11ax, 802.11ac, 802.11n, 802.11g, 802.11b, and 802.11a.

The access point in this application may be a high efficiency (HE) STA or an extremely high throughput (EHT) STA, or may be a STA applicable to a future Wi-Fi standard.

For example, the access point and the station may be devices used in the Internet of vehicles, Internet of things nodes or sensors in the Internet of things (IoT), smart cameras, smart remote controls, and smart water meters in a smart home, and sensors in a smart city.

Although embodiments of this application are mainly described by using a network deployed based on IEEE 802.11 as an example, a person skilled in the art easily understands that various aspects of this application may be extended to other networks using various standards or protocols such as Bluetooth, a high performance radio LAN (HIPERLAN) (a wireless standard similar to the IEEE 802.11 standard and mainly used in Europe), a wide area network (WAN), a wireless local area network (WLAN), a personal area network (PAN), or other networks currently known or later developed. Therefore, the various aspects provided in this application are applicable to any suitable wireless network regardless of coverage and a wireless access protocol.

Figure 4:
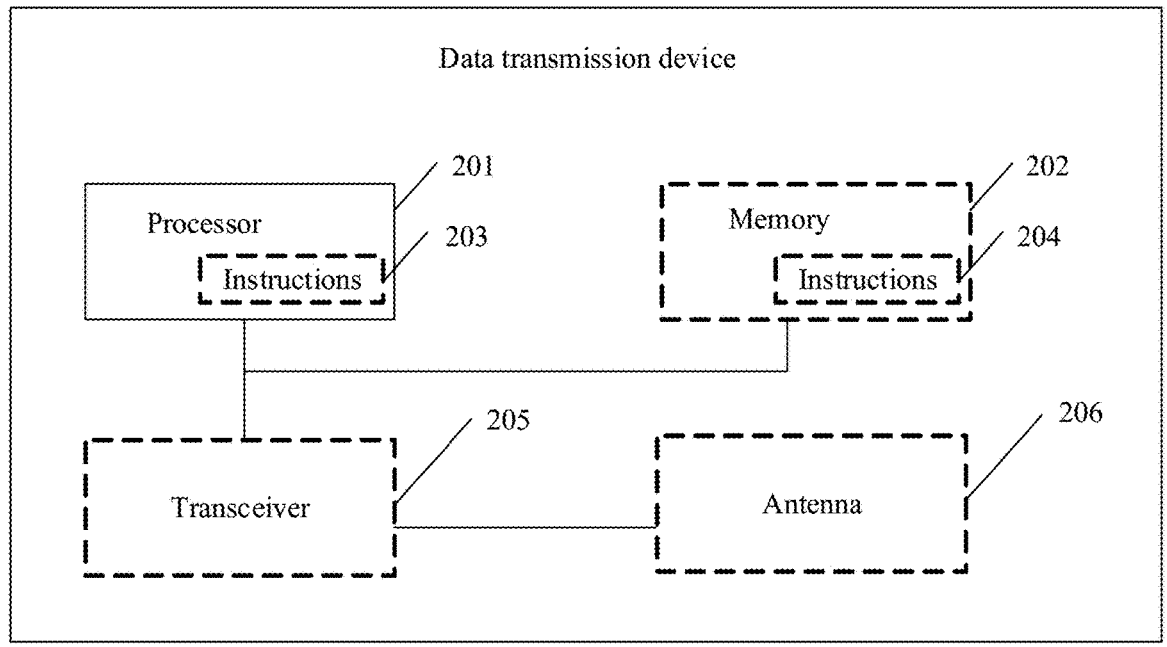
FIG. 4 is a schematic diagram of a structure of a data transmission device according to an embodiment of this application.

FIG. 4 is a schematic diagram of a structure of a data transmission device according to an embodiment of this application. As shown in FIG. 4, the data transmission device 200 may include a processor 201 and a transceiver 205, and optionally further includes a memory 202.

The transceiver 205 may be referred to as a transceiver unit, a transceiver machine, a transceiver circuit, or the like, and is configured to implement a transceiver function. The transceiver 205 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

The memory 202 may store a computer program, software code, or instructions 204, where the computer program, the software code, or the instructions 204 may further be referred to as firmware. The processor 201 may control a MAC layer and a PHY layer by running a computer program, software code, or instructions 203 in the processor 201, or by invoking the computer program, the software code, or the instructions 204 stored in the memory 202, to implement the following embodiments of this application. The processor 201 may be a central processing unit (CPU), and the memory 202 may be, for example, a read-only memory (ROM), or a random access memory (RAM).

The processor 201 and the transceiver 205 described in this application may be implemented in an integrated circuit (IC), an analog IC, a radio frequency integrated circuit RFIC, a mixed-signal IC, an application-specific integrated circuit (ASIC), a printed circuit board (PCB), an electronic device, or the like.

The data transmission device 200 may further include an antenna 206. The modules included in the data transmission device 200 are merely examples for description, and are not limited in this application.

Figure 5:
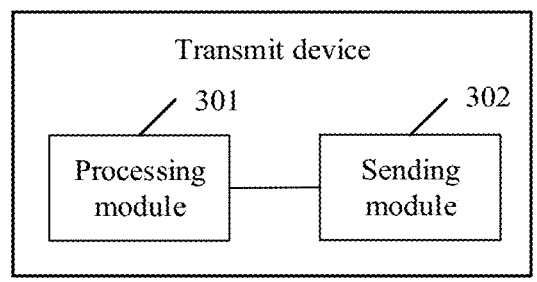
FIG. 5 is a schematic diagram of a structure of a transmit device according to an embodiment of this application.

FIG. 5 is a schematic diagram of a structure of a transmit device according to an embodiment of this application. The transmit device may be configured to implement any method and function related to the transmit device in embodiments of this application. The transmit device may include a processing module 301 and a sending module 302. Optionally, the sending module 302 corresponds to one baseband circuit and one radio frequency circuit that are included in the transmit device. The transmit device acts as a transmit end of data transmission. Detailed descriptions of the modules are as follows.

In an embodiment, the transmit device includes:
the processing module 301, configured to scramble to-be-transmitted data, to obtain scrambled data; and
the sending module 302, configured to send the scrambled data to a receive device.

The initialization bits of a scrambler used to scramble the data include a first bit sequence and a second bit sequence. The first bit sequence is carried in a service field of the to-be-transmitted data, the second bit sequence reuses a bit in a signal field, and the quantity of the initialization bits is equal to the order of the scrambler. In the transmit device in this application, when the transmit device and the receive device use the scrambler with a higher order than that in the conventional technology, the initialization bits of the scrambler are based on bits in an existing service field used for data scrambling and reused bits in some signal fields. In this way, the PAPR is reduced without increasing the overhead of the service field, and the network throughput is improved.

In an implementation, the first bit sequence is carried in first 7 bits in the service field. In another implementation, the first bit sequence may alternatively be 5 bits, 6 bits, 8 bits, 9 bits, 10 bits, 11 bits, 12 bits, 13 bits, 14 bits, 15 bits, 16 bits, or the like.

An order of a scrambler corresponds to at least one of a resource unit size and a modulation and coding scheme.

The second bit sequence reuses bits that are in the signal field and that correspond to at least one type of indication information indicating a channel bandwidth, a modulation and coding scheme, an association identifier, or a basic service set.

The second bit sequence may be bits or a combination thereof used to indicate the channel bandwidth, the MCS, the AID, and the BSS. An order of sending such bits and an order of the first bit sequence and the second bit sequence are not limited, provided that the transmit device and the receive device perform as agreed.

The first bit sequence is set to 0 before the data is scrambled. 9 bits in the service field other than the first 7 bits are set as parity check bits in the signal field.

In another embodiment, the transmit device includes:
the processing module 301, configured to scramble to-be-transmitted data, to obtain scrambled data, where an order of a scrambler used to scramble the data corresponds to at least one of a resource unit size and a modulation and coding scheme, and the scrambler is a higher order and lower order integrated scrambler; and
the sending module 302, configured to send the scrambled data to a receive device.

The scrambler used in embodiments integrates a plurality of scramblers with different orders, including a 7-order scrambler used in an existing Wi-Fi standard. The transmit device determines an order of the scrambler based on at least one of the following information: a channel bandwidth for transmitting data, a modulation and coding scheme, or a size of a resource unit allocated to a user. When the channel bandwidth is wide, or the resource unit allocated to the user is large, or the modulation and coding scheme has a high modulation order, a higher order scrambler is used. When the channel bandwidth is small, the resource unit allocated to the user is small, or the modulation and coding scheme has a low modulation order, a lower order decoder may be used. In this way, system flexibility is improved, and no high PAPR occurs due to non-random data in wide bandwidth and higher order modulation and coding conditions.

Figure 6:
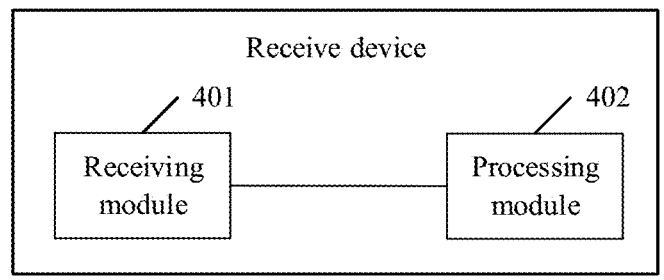
FIG. 6 is a schematic diagram of a structure of a receive device according to an embodiment of this application.

FIG. 6 is a schematic diagram of a structure of a receive device according to an embodiment of this application. The receive device may be configured to implement any method and function related to the receive device in any embodiment of this application. The receive device may include a receiving module 401 and a processing module 402. The receive device acts as a receive end of data transmission. Detailed descriptions of the modules are as follows.

In an implementation,
the receive device includes:
the receiving module 401, configured to receive scrambled data, where
the initialization bits of a scrambler used to descramble the data include a first bit sequence and a second bit sequence, where the first bit sequence is carried in a service field of the data, the second bit sequence reuses a bit in a signal field, and the quantity of the initialization bits is equal to the order of the scrambler;
in an implementation, the first bit sequence is carried in first 7 bits in the service field. In another implementation, the first bit sequence may alternatively be 5 bits, 6 bits, 8 bits, 9 bits, 10 bits, 11 bits, 12 bits, 13 bits, 14 bits, 15 bits, 16 bits, or the like; and
the processing module 402, configured to descramble the scrambled data, to obtain descrambled data.

In the receive device in this application, when the transmit device and the receive device use the scrambler with a higher order than that in the conventional technology, the initialization bits of the scrambler are based on bits in an existing service field used for data scrambling and reused bits in some signal fields. In this way, the PAPR is reduced without increasing the overhead of the service field, and the network throughput is improved.

An order of a scrambler corresponds to at least one of a resource unit size and a modulation and coding scheme.

The second bit sequence reuses bits that are in the signal field and that correspond to at least one type of indication information indicating a channel bandwidth, a modulation and coding scheme, an association identifier, or a basic service set.

The second bit sequence may be bits or a combination thereof used to indicate the channel bandwidth, the MCS, the AID, and the BSS. An order of sending such bits and an order of the first bit sequence and the second bit sequence are not limited, provided that the transmit device and the receive device perform as agreed.

9 bits in the service field other than the first 7 bits are set as parity check bits in the signal field.

In another implementation, the receive device includes:
the receiving module 401, configured to receive scrambled data; and
the processing module 402, configured to descramble the scrambled data, to obtain descrambled data.

An order of a scrambler used to descramble the data corresponds to at least one of a resource unit size and a modulation and coding scheme. The scrambler is a higher order and lower order integrated scrambler.

The scrambler used in embodiments integrates a plurality of scramblers with different orders, including a 7-order scrambler used in an existing Wi-Fi standard. An order of the scrambler is determined based on at least one of the following information: a channel bandwidth for transmitting data, a modulation and coding scheme, or a size of a resource unit allocated to a user. When the channel bandwidth is wide, or the resource unit allocated to the user is large, or the modulation and coding scheme has a high modulation order, a higher order scrambler is used. When the channel bandwidth is small, the resource unit allocated to the user is small, or the modulation and coding scheme has a low modulation order, a lower order decoder may be used. In this way, system flexibility is improved, and no high PAPR occurs due to non-random data in wide bandwidth and higher order modulation and coding conditions.

It should be noted that, for implementation of each module, refer to the corresponding description in the method embodiments of this application, to perform the method and the function performed by the receive device in the foregoing embodiment.

An embodiment of this application further provides a processor. The processor is configured to be coupled to a memory, to perform the method and the functions in any embodiment of this application.

An embodiment of this application further provides a computer program product including instructions. When the computer program product runs on a computer, the computer is enabled to perform the method and the functions in any embodiment of this application.

An embodiment of this application further provides an apparatus, configured to perform any method and function that are related to any one of embodiments of this application.

An embodiment of this application further provides a wireless communications system. The system includes at least one transmit device and at least one receive device in any embodiment of this application.

As described above, the data transmission device described in the foregoing embodiment may be an access point or a station. However, a scope of the data transmission device described in this application is not limited thereto, and the structure of the data transmission device may not be limited in FIG. 4 to FIG. 6. The data transmission device may be an independent device, or a part of a large device. For example, the data transmission device may be implemented in the following form:

(1) an independent integrated circuit (IC), a chip, a chip system, or a subsystem; (2) a set including one or more ICs, where optionally, the set of ICs may also include a storage component for storing data and instructions; (3) a module that can be embedded in other devices; (4) a receiver, an intelligent terminal, a wireless device, a handheld device, a mobile unit, a vehicle-mounted device, a cloud device, an artificial intelligence device, or the like; or (5) others.

Figure 7:
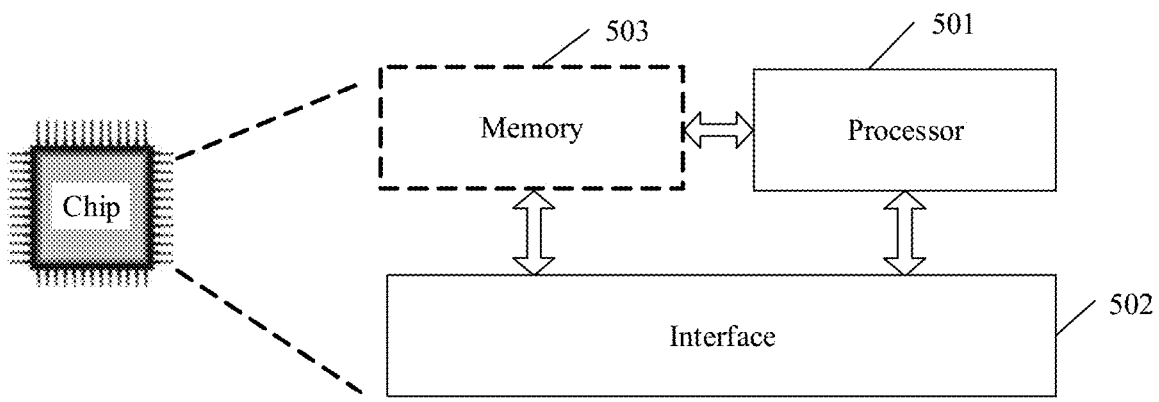
FIG. 7 is a schematic diagram of a structure of a chip system according to an embodiment of this application.

For the data transmission device implemented in the form of the chip or the chip system, refer to a schematic diagram of a structure of a chip shown in FIG. 7. The chip shown in FIG. 7 includes a processor 501 and an interface 502. There may be one or more processors 501, and there may be a plurality of interfaces 502. Optionally, the chip or the chip system may include a memory 503.

Embodiments of this application do not limit the protection scope and applicability of the claims. A person skilled in the art may adaptively change functions and deployments of elements in this application, or omit, replace, or add various processes or components as appropriate without departing from the scope of the embodiments of this application.

For ease of understanding related content in embodiments of this application, the following describes some concepts related to embodiments of this application.

1. Data Transmission

The data transmission method in this application may be applicable to uplink transmission, or may be applicable to downlink transmission. In addition, the data transmission method is further applicable to point-to-point single-user transmission, downlink multi-user transmission, or uplink multi-user transmission. For uplink multi-user transmission, an uplink transmission method based on a trigger frame is used in the data transmission method. The following separately describes a trigger-based data packet and a non-trigger-based data packet.

2. EHT TB PPDU

The trigger-based data packet may be an extremely high throughput trigger-based physical layer protocol data unit (EHT TB PPDU), a trigger-based physical layer protocol data unit in a future generation Wi-Fi standard, or the like.

An example of a structure of sending an EHT TB PPDU based on a trigger frame is shown in FIG. 8. From an EHT-STF to Data, an entire bandwidth is divided into one or more resource units. A function of each field in the EHT TB PPDU in FIG. 8 is shown in Table 2.

The data part includes a 16-bit service field.

TABLE 2

| Item | Description |
| --- | --- |
| Legacy short training field (L-STF) | For PPDU discovery, coarse synchronization, and automatic gain control |
| Legacy long training field (L-LTF) | For fine synchronization and channel estimation |
| Legacy signal field (L-SIG) | Carries signaling information related to a PPDU length, to ensure coexistence |
| Universal signal field (U-SIG) | Carrying signaling for demodulating subsequent data |
| Extremely high throughput short training field (EHT-STF) | For automatic gain control of a subsequent field |
| Extremely high throughput long training field (EHT-LTF) | For channel estimation |
| Data | Carries data information; first 16 bits are the service field. |

For an uplink PPDU, the initialization bits of a scrambler used to scramble the data provided in this application include a first bit sequence and a second bit sequence. The first bit sequence is carried in a service field of the to-be-transmitted data, as shown in the service field of the data part in FIG. 8. The second bit sequence reuses a bit in a signal field. In a specific implementation, the second bit sequence reuses bits that are in the U-SIG in FIG. 8 and that indicate a channel bandwidth, or reuses bits that are in the U-SIG and that indicate a modulation and coding scheme, or reuses bits that are in the U-SIG and that indicate an association identifier, or reuses bits that are in the U-SIG and that indicate a basic service set.

In this embodiment, the U-SIG is merely an example, and may also be referred to as EHT-SIGA. With development of a standard, the U-SIG may have another name.

The second bit sequence may be bits or a combination thereof used to indicate the channel bandwidth, the MCS, the AID, and the BSS. An order of sending such bits and an order of the first bit sequence and the second bit sequence are not limited, provided that the total quantity of bits of the first bit sequence and the second bit sequence is the same as the order of the scrambler.

3. EHT PPDU

Figure 9:
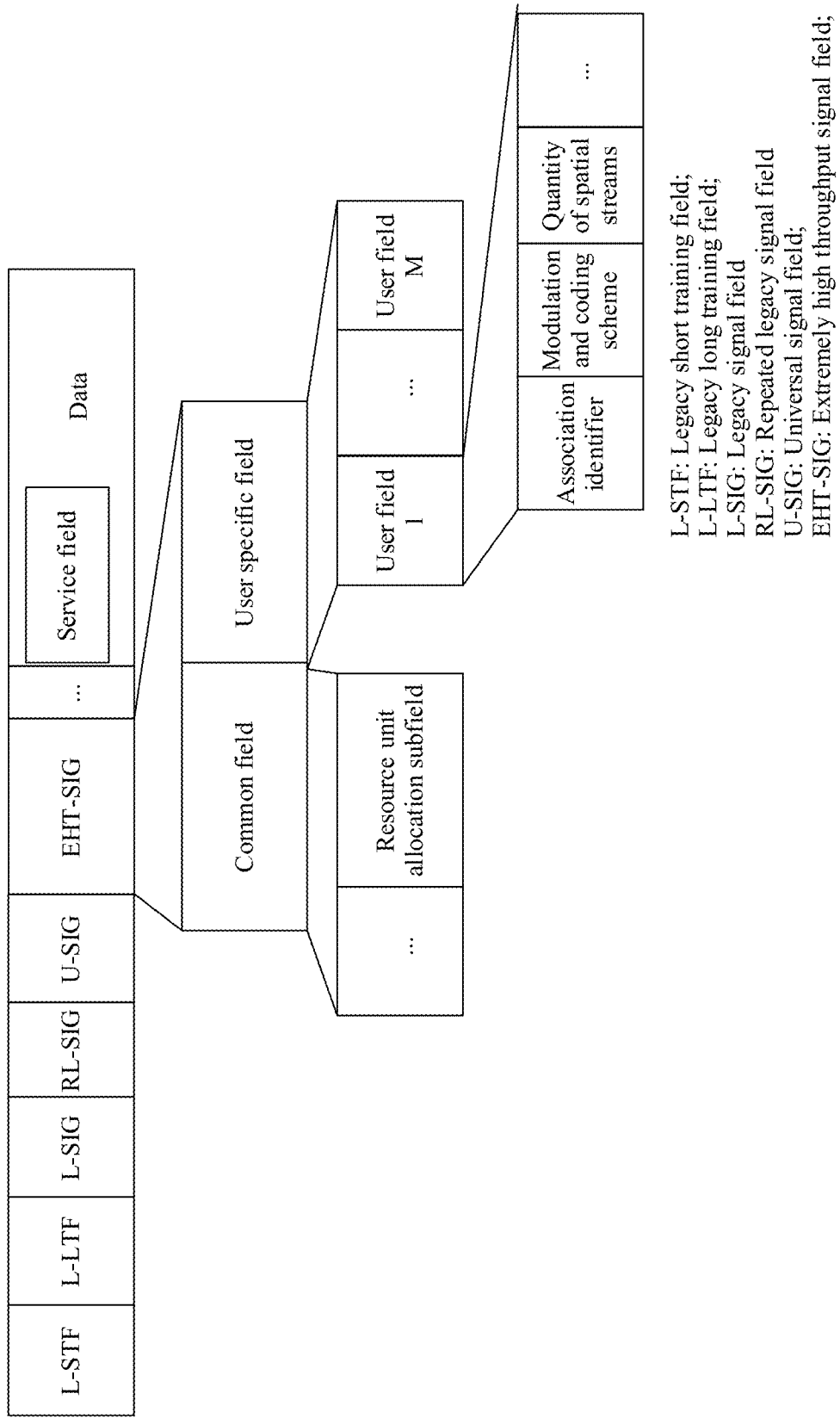
FIG. 9 is a schematic diagram of a structure of a non-trigger-based data packet according to an embodiment of this application.

FIG. 9 is a schematic diagram of a structure of an extremely high throughput physical layer protocol data unit according to an embodiment of this application. As shown in FIG. 9, the data packet includes a legacy short training field (L-STF), a legacy long training field (L-LTF), a legacy signal field (L-SIG), a repeated legacy signal field (RL-SIG), a universal signal field (U-SIG), an extremely high throughput signal field (EHT-SIG), data, and the like. Information carried in the U-SIG and the EHT-SIG can help parse the EHT PPDU, and the U-SIG and the EHT-SIG includes bits used to indicate information such as a channel bandwidth and a modulation and coding scheme. In addition, the EHT-SIG is divided into two parts. A first part, namely, a common field includes 1 to N resource unit allocation subfields, and a second part, namely, a user specific field includes 1 to M user fields based on a resource unit allocation order. The user field includes bits used to indicate information such as an association identifier (AID), and modulation and coding measurement.

The data part includes a service field, usually 16 bits long.

FIG. 9 is merely a schematic diagram of the EHT PPDU. This is not limited in this application.

For a downlink PPDU, the initialization bits of a scrambler used to scramble the data provided in this application include a first bit sequence and a second bit sequence. The first bit sequence is carried in a service field of the to-be-transmitted data, as shown in the service field of the data part in FIG. 9. The second bit sequence reuses a bit in a signal field. In a specific implementation, the second bit sequence reuses bits that are in the U-SIG in FIG. 9 and that indicate a channel bandwidth, or reuses bits that are in the EHT-SIG and that indicate a modulation and coding scheme, or reuses bits that are in the EHT-SIG and that indicate an association identifier, or reuses bits that are in the EHT-SIG and that indicate a basic service set.

In this embodiment, the U-SIG and the EHT-SIG are merely examples. With development of a standard, the U-SIG and the EHT-SIG may have other names. In addition, the bits used to indicate the channel bandwidth, the MCS, the AID, and the BSS may be located in the U-SIG or the EHT-SIG. This is not limited in this embodiment of this application.

The second bit sequence may be bits or a combination thereof used to indicate the channel bandwidth, the MCS, the AID, and the BSS. An order of sending such bits and an order of the first bit sequence and the second bit sequence are not limited, provided that the total quantity of bits of the first bit sequence and the second bit sequence is the same as the order of the scrambler.

With reference to accompanying drawings and the foregoing related concept descriptions, the following further describes related content of this application.

In the previous generation 802.11ax Wi-Fi standard, a length of an information stream that can be carried in one OFDM symbol is 16333. Therefore, an order of a scrambler needs to be at least 14, to reduce occurrence of repeated signals in one OFDM symbol. In the next generation Wi-Fi standard, because the channel bandwidth is upgraded from 160 MHz to 320 MHz, and higher-order modulation, such as 4096-QAM, may be introduced, the order of the scrambler is at least 17. Therefore, the following types of scramblers are designed in embodiments of this application.

(1) 17-Order Scrambler

Figure 10:
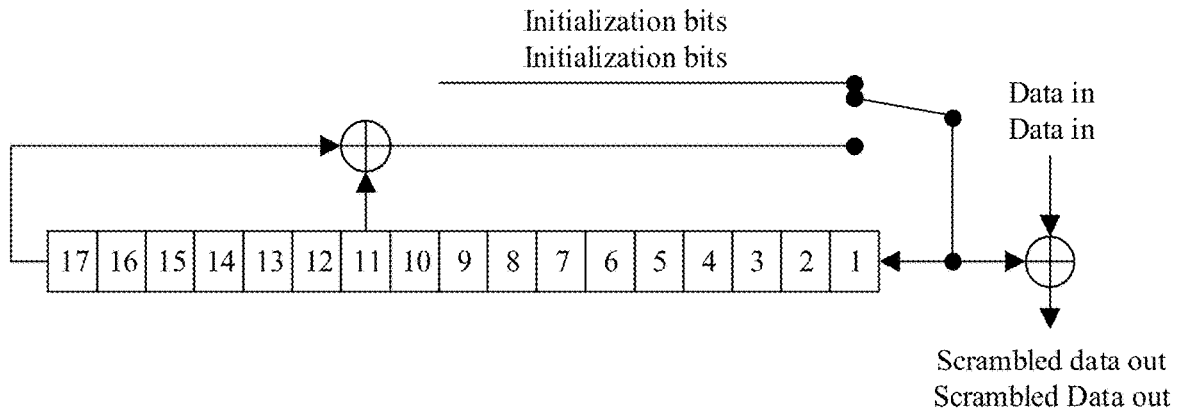
FIG. 10 is a schematic diagram of a structure of a 17-order scrambler according to an embodiment of this application.
Figure 11:
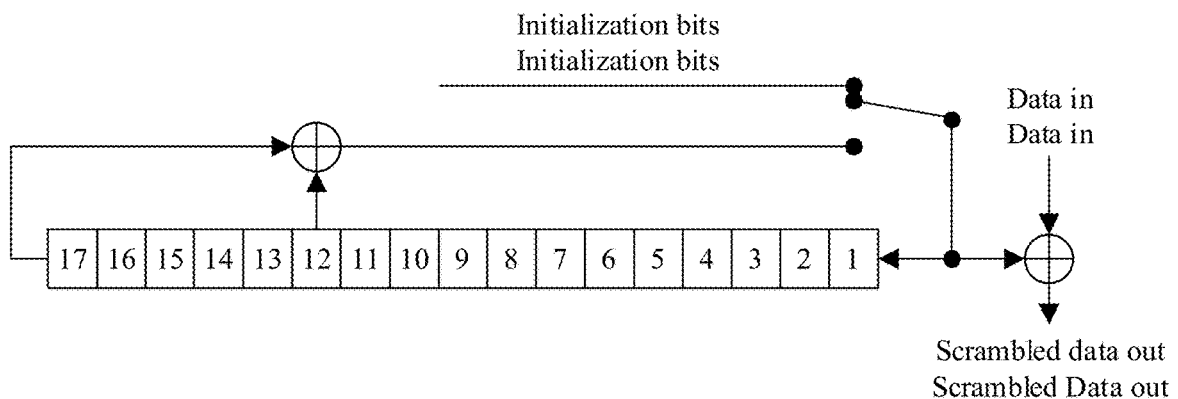
FIG. 11 is a schematic diagram of a structure of another 17-order scrambler according to an embodiment of this application.
Figure 12:
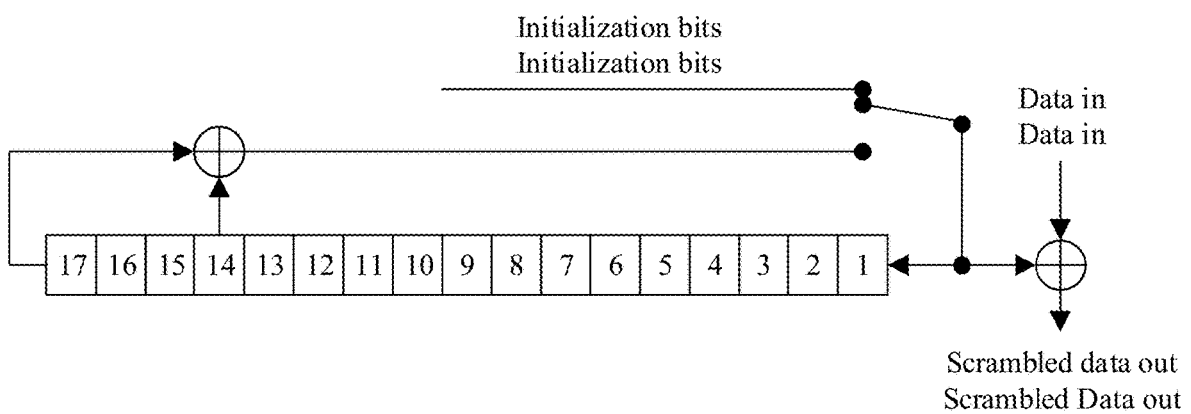
FIG. 12 is a schematic diagram of a structure of another 17-order scrambler according to an embodiment of this application.

Three types of 17-order scramblers 17a, 17b, and 17c provided in this application are respectively shown in FIG. 10, FIG. 11, and FIG. 12, and are expressed by using polynomials as follows:

$$G(x)_{17,a} = X^{17} + X^{11} + 1$$

$$G(x)_{17,b} = X^{17} + X^{12} + 1$$

$$G(x)_{17,c} = X^{17} + X^{14} + 1$$

The three types of scramblers include 17 registers, in other words, an order m of the scrambler is 17. Therefore, a length of a longest non-repeated sequence that can be generated by the scrambler is 131071. A transmit device performs an XOR operation on an original information bit stream and the periodic sequence, and encodes and sends an XOR result to a receive device.

(2) 18-Order Scrambler

Figure 13:
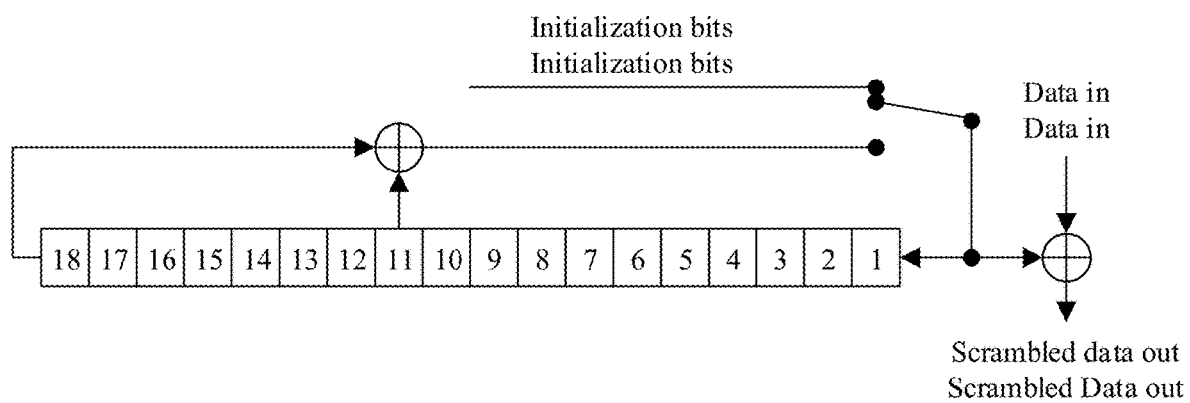
FIG. 13 is a schematic diagram of a structure of an 18-order scrambler according to an embodiment of this application.

One type of 18-order scrambler provided in this application is shown in FIG. 13, and is expressed by using a polynomial as follows:

$$G(x)_{18} = X^{18} + X^{11} + 1$$

The scrambler includes 18 registers, in other words, an order m of the scrambler is 18. Therefore, a length of a longest non-repeated sequence that can be generated by the scrambler is 262144. A transmit device performs an XOR operation on an original information bit stream and the periodic sequence, and encodes and sends an XOR result to a receive device.

(3) 20-Order Scrambler

Figure 14:
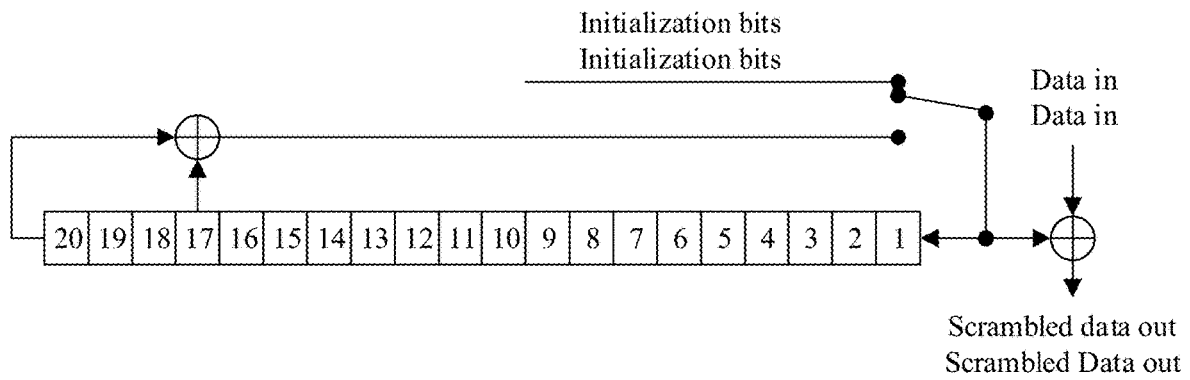
FIG. 14 is a schematic diagram of a structure of a 20-order scrambler according to an embodiment of this application.

One type of 20-order scrambler provided in this application is shown in FIG. 14, and is expressed by using a polynomial as follows:

$$G(x)_{20} = X^{20} + X^{17} + 1$$

The scrambler includes 20 registers, in other words, an order m of the scrambler is 20. Therefore, a length of a longest non-repeated sequence that can be generated by the scrambler is 1048575. A transmit device performs an XOR operation on an original information bit stream and the periodic sequence, and encodes and sends an XOR result to a receive device.

It should be understood that the 17-order, 18-order, and 20-order scramblers are merely examples. For a higher-order modulation method and a wider channel bandwidth, a plurality of higher-order scrambler variants may be further provided based on the higher-order scrambler.

To enable the receive device to learn of an initial state of the scrambler, in a manner provided in this embodiment of this application, a 16-bit service field carries some initialization bits of the scrambler, for example, 7 bits (B0 to B6), to synchronize with a descrambler. The 7 initialization bits of the scrambler may be set to "0", to help estimate an initial state of the scrambler of the receive device. Remaining 9 bits in the service field may be further reserved, or may be set to "0"; or may be used to store a parity check bit of SIG-B, and a transmit order may be from a low bit 0 to a high bit 15.

In another implementation, the first bit sequence may alternatively be 5 bits, 6 bits, 8 bits, 9 bits, 10 bits, 11 bits, 12 bits, 13 bits, 14 bits, 15 bits, 16 bits, or the like.

The service field is shown in Table 3:

TABLE 3

| Service field | | |
|---|---|---|
| Bits | Field | Description |
| B0 to B6 | (Some) initialization bits of a scrambler | Set to 0 before scrambling |
| B7 to B15 | Reserved or used for storing a parity check bit of SIG-B | Reserved or used for storing the parity check bit of the SIG-B |

For some other initialization bits of the scramblers, during uplink transmission, the bits in the signal field U-SIG in an uplink EHT TB PPDU described above are reused; or during downlink transmission, the bits in the signal field (U-SIG and/or EHT-SIG) in the EHT PPDU described above are reused. A specific reuse manner has been described in detail above, and details are not described herein again.

The total quantity of the initialization bits reused in the signal field and initialization bits in the service field is equal to the order of the scrambler.

The transmit device and the receive device use a same scrambler with a generator polynomial by default in the 17-order, 18-order, or 20-order scramblers. The 17-order scrambler is used as an example, and working principles are as follows:

A scrambling process of the transmit device: In each data packet transmission, the scrambler randomly selects one non-zero initial state. The initial state includes first 7 bits in the service field and 10 bits in the signal field, and corresponds to initial bit values of the 17 registers. The scrambler cyclically generates 131071 bits, performs XOR on a continuously repeated 131071-bit sequence and input data bits, and outputs scrambled data bits. Finally, the scrambled data bits are sent.

A descrambling process of the receive device: When receiving the scrambled data bits, the receive device obtains the initial state of the scrambler based on a first bit sequence parsed from first 7 bits in the scrambled data bits and a second bit sequence of the signal field. After obtaining the initial state of the scrambler, the receive device may repeatedly generate 131071 bits, and perform XOR on the 131071 bits and the scrambled data bits, to obtain original data bits before scrambling.

A prerequisite for correct descrambling by the receive device is that the receive device knows that the initial state of the scrambler can be inferred.

Processes of scrambling and descrambling by the 18-order scrambler and the 20-order scrambler are similar to that of scrambling and descrambling. Details are not described again.

It should be understood that, if coefficients of a generator polynomial of the scrambler are reversed in order, a new scrambler and the scrambler before reversal generate a same scrambling sequence in an opposite direction. The two sequences have same performance, and therefore are not described herein. Specifically, for a scrambler with a generator polynomial $G(X)_a = \Sigma_{i=0}^{m} g_i X^i$, a generator polynomial corresponding to a new scrambler is $G(X)_b = \Sigma_{i=0}^{m} g_i X^{m-i}$ after polynomial coefficients of the scrambler are reversed in order. If a scrambling sequence generated by the scrambler G(X)$_a$ is ABCD ... XYZ, a scrambling sequence generated by the scrambler G(X)$_b$ is ZYX ... DCBA.

Figure 15:
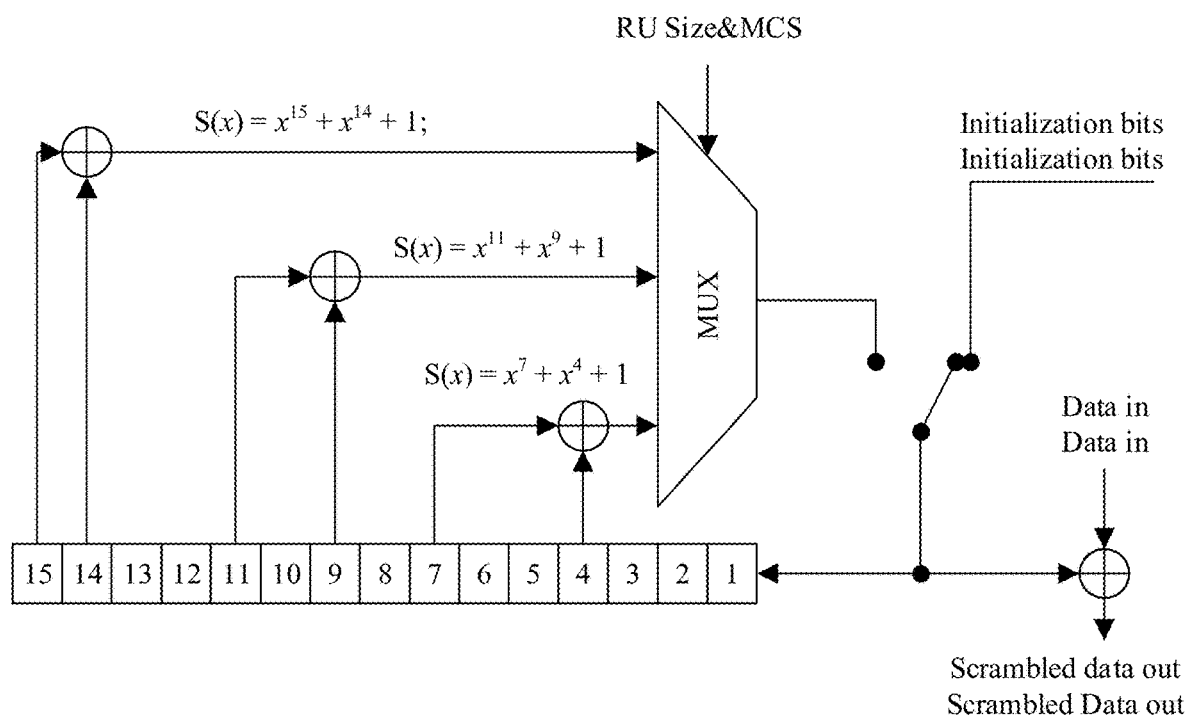
FIG. 15 is a schematic diagram of a structure of a higher order and lower order integrated scrambler according to an embodiment of this application.

This application further provides a higher order and lower order integrated scrambler. As shown in FIG. 15, the higher order and lower order integrated scrambler includes a plurality of scramblers with different orders, such as a 7-order scrambler, an 11-order scrambler, and a 15-order scrambler. The scramblers with different orders are connected in parallel. The 7-order scrambler is represented by a polynomial G(X)=$X^7+X^4+1$, the 11-order scrambler is represented by a polynomial G(X)=$X^{11}+X^9+1$, and the 15-order scrambler is represented by a polynomial G(X)=$X^{15}+X^{14}+1$. The scrambler integrates a plurality of scramblers with different orders, including a 7-order scrambler used in an existing Wi-Fi standard. The transmit device determines an order of the scrambler based on at least one of the following information: a channel bandwidth for transmitting data, a modulation and coding scheme, or a size of a resource unit allocated to a user. When the channel bandwidth is wide, or the resource unit allocated to the user is large, or the modulation and coding scheme has a high modulation order, a higher order scrambler is used. When the channel bandwidth is small, the resource unit allocated to the user is small, or the modulation and coding scheme has a low modulation order, a lower order decoder may be used.

For example, when a bandwidth corresponding to an RU allocated to a user is less than 80 MHz, a conventional 7-order scrambler may be used. When a bandwidth corresponding to an RU allocated to a user is greater than or equal to 80 MHz but does not exceed 160 MHz, an 11-order medium order scrambler may be used. When a system bandwidth corresponding to an RU not allocated to a user is greater than 160 MHz, a 15-order higher order scrambler may be used.

FIG. 15 is merely an example of a higher order and lower order integrated scrambler, or may be a combination of other higher order and lower order scramblers. The integrated scrambler may alternatively have another implementation form, which is not enumerated in this application.

With the higher order and lower order integrated scrambler provided in this application, the transmit device can select scramblers with different orders based on at least one of the following information: a channel bandwidth, a modulation and coding scheme, or a size of a resource unit allocated to a user. In this way, system flexibility is improved, and no high PAPR occurs due to non-random data in wide bandwidth and higher order modulation and coding conditions.

For a low-cost device, for example, an Internet of Things (IoT) device or a device that supports only a 20 MHz bandwidth, during a product implementation, a higher order scrambler is not needed, and a conventional lower order scrambler may still be used. In this way, hardware costs and device complexity can be reduced.

For a device that supports higher order scrambling, no additional shift register is added to implement the lower order scrambler in this application. Therefore, compatibility of the device with the lower order scrambler does not cause excessively large hardware overheads.

The following describes in detail a process of implementing data transmission by using the scrambler.

Figure 16:
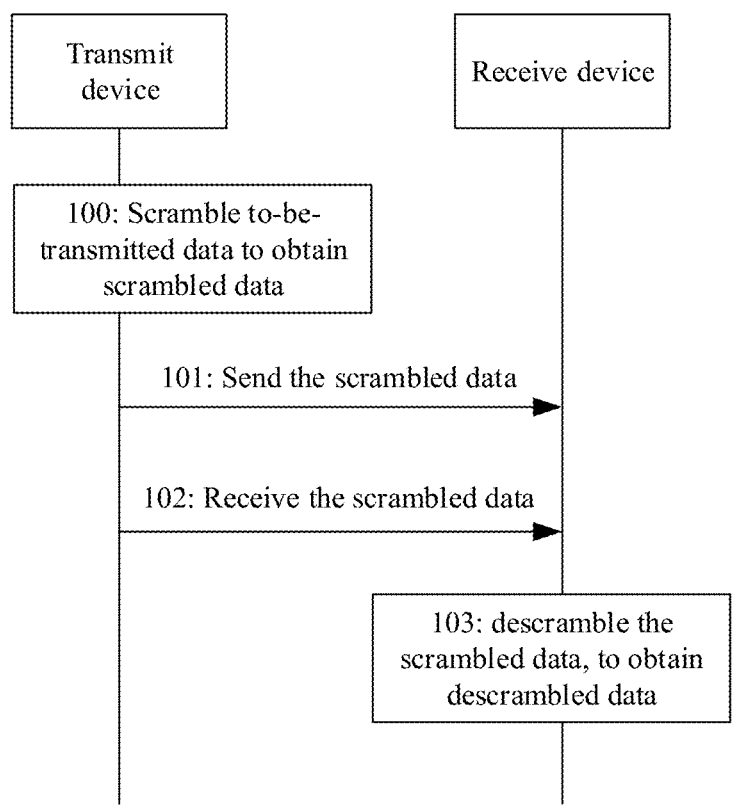
FIG. 16 is a schematic flowchart of a data transmission method according to an embodiment of this application.

FIG. 16 is a schematic diagram of a data transmission method according to this application. In an implementation, the data transmission method includes the following steps.

Step 100: A transmit device scrambles to-be-transmitted data to obtain scrambled data.

The initialization bits of a scrambler used to scramble the data include a first bit sequence and a second bit sequence. The first bit sequence is carried in a service field of the to-be-transmitted data, the second bit sequence reuses a bit in a signal field, and the quantity of the initialization bits is equal to the order of the scrambler.

Step 101: The transmit device sends the scrambled data to a receive device.

Step 102: The receive device receives the scrambled data.

Step 103: The receive device descrambles the scrambled data, to obtain descrambled data.

The initialization bits of a scrambler used to descramble the data include a first bit sequence and a second bit sequence. The first bit sequence is carried in a service field of the data, the second bit sequence reuses a bit in a signal field, and the quantity of the initialization bits is equal to the order of the scrambler.

In an implementation, the first bit sequence is carried in first 7 bits in the service field. In another implementation, the first bit sequence may alternatively be 5 bits, 6 bits, 8 bits, 9 bits, 10 bits, 11 bits, 12 bits, 13 bits, 14 bits, 15 bits, 16 bits, or the like.

It should be understood that the scrambler described in this application may be a higher order scrambler. For example, the scrambler may be the scrambler shown in FIG. 10 to FIG. 14.

In another implementation, the scrambler may be the higher order and lower order integrated scrambler shown in FIG. 15. To be specific, the transmit device determines an order of the scrambler based on at least one of the following information: a channel bandwidth for transmitting data, a modulation and coding scheme, or a size of a resource unit allocated to a user. When the channel bandwidth is wide, or the resource unit allocated to the user is large, or the modulation and coding scheme has a high modulation order, a higher order scrambler is used. When the channel bandwidth is small, the resource unit allocated to the user is small, or the modulation and coding scheme has a low modulation order, a lower order decoder may be used.

Regardless of an independent higher order scrambler or a higher order and lower order integrated scrambler, the quantity of the initialization bits input to the scrambler is the same as the order of the scrambler. The initialization bits specifically include two parts: a first bit sequence and a second bit sequence.

The first bit sequence is shown as B0 to B6 in the service field in Table 2. The first bit sequence is set to 0 before the data is scrambled. 9 bits in the service field other than the first 7 bits are set as parity check bits in the signal field. Specifically, for uplink transmission, the 9 bits may be set as parity check bits of the U-SIG, and for downlink transmission, the 9 bits may be set as parity check bits of the SIG-B.

The second bit sequence reuses bits that are in the signal field and that correspond to at least one type of indication information indicating a channel bandwidth, a modulation and coding scheme, an association identifier, or a basic service set.

A manner in which the second bit sequence reuses the bits in the signal field has been described in detail above, and details are not described herein again.

First 7 bits in the service field are still used as some initialization bits of the scrambler, and this is compatible with the existing 802.11ax standard to the greatest extent. Some bits in a signal field to be transmitted during data transmission are reused as some other initialization bits, and no additional overhead is added. Optionally, the remaining 9 bits in the service field may be further set as parity check bits, to check the signal field. This can further enhance transmission performance.

In another implementation, the data transmission method includes:

Step 100: A transmit device scrambles to-be-transmitted data to obtain scrambled data.

An order of a scrambler used to scramble the data corresponds to at least one of a resource unit size and a modulation and coding scheme.

Step 101: The transmit device sends the scrambled data to a receive device.

Step 102: The receive device receives the scrambled data.

Step 103: The receive device descrambles the scrambled data, to obtain descrambled data.

In an implementation, the scrambler in this embodiment may be a higher order scrambler. For example, the scrambler may be any of the scramblers shown in FIG. 10 to FIG. 14.

In another implementation, the scrambler is the higher order and lower order integrated scrambler shown in FIG. 15. The transmit device determines an order of the scrambler based on at least one of the following information: a channel bandwidth for transmitting data, a modulation and coding scheme, or a size of a resource unit allocated to a user. When the channel bandwidth is wide, or the resource unit allocated to the user is large, or the modulation and coding scheme has a high modulation order, a higher order scrambler is used. When the channel bandwidth is small, the resource unit allocated to the user is small, or the modulation and coding scheme has a low modulation order, a lower order decoder may be used.

It should be understood that in the foregoing two data transmission methods, step 100 performed by the transmit device may be performed by the processor 201 shown in FIG. 4, where the processor 201 may implement a function of the scrambler, or may be performed by the processing module 301 shown in FIG. 5, or may be performed by the processor 501 shown in FIG. 7. Step 101 performed by the transmit device may be performed by the transceiver 205 shown in FIG. 4, or may be performed by the sending module 302 shown in FIG. 5, or may be further performed through the interface shown in FIG. 7. Information such as the scrambling code sequence and the data may be stored by the memory 202 shown in FIG. 4, or may be executed by the memory (not shown in the figure) of the transmit device shown in FIG. 5, or may be executed by the memory 503 shown in FIG. 7.

Step 102 performed by the receive device may be performed by the transceiver 205 shown in FIG. 4, or may be performed by the receiving module 401 shown in FIG. 6, or may be performed through the interface shown in FIG. 7. Step 103 performed by the receive device may be performed by the processor 201 shown in FIG. 4, where the processor 201 may implement a function of the scrambler, or may be performed by the processing module 402 shown in FIG. 6, or may be performed by the processor 501 shown in FIG. 7. Information such as the scrambling code sequence and the data may be stored by the memory 202 shown in FIG. 4, or may be executed by the memory (not shown in the figure) of the transmit device shown in FIG. 6, or may be executed by the memory 503 shown in FIG. 7.

A person skilled in the art may further understand that various illustrative logical blocks (illustrative logic block) and steps that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the scope of embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded or executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state disk (SSD)), or the like.

A person of ordinary skill in the art may understand that various numerals such as "first" and "second" in this application are merely used for differentiation for ease of description, and are not used to limit the scope of embodiments of this application or represent a sequence.

The correspondences shown in the tables in this application may be configured, or may be predefined. Values of the information in the tables are only examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communications apparatus, and values or representation manners of the parameters may alternatively be other values or representation manners that can be understood by the communications apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person skilled in the art may be aware that units and algorithm steps in the examples described with reference to the embodiments disclosed in this specification can be implemented by electronic hardware or an interaction of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
scrambling to-be-transmitted data, to obtain scrambled data; and
sending the scrambled data to a receive device, wherein
initialization bits of a scrambler used to scramble the data comprise a first bit sequence and a second bit sequence, wherein the first bit sequence is carried in a service field of the to-be-transmitted data, the second bit sequence reuses a bit in a signal field in a physical layer protocol data unit (PPDU), and a quantity of the initialization bits is equal to an order of the scrambler.

2. The method according to claim 1, wherein the order of the scrambler corresponds to at least one of a resource unit size or a modulation and coding scheme.

3. The method according to claim 1, wherein the second bit sequence reuses bits that are in the signal field and correspond to at least one type of indication information indicating a channel bandwidth, a modulation and coding scheme, an association identifier, or a basic service set.

4. The method according to claim 3, wherein the first bit sequence is 7 bits and is carried in first 7 bits in the service field; and the first bit sequence is set to 0 before the data is scrambled.

5. The method according to claim 4, wherein 9 bits in the service field other than the first 7 bits are set as parity check bits in the signal field.

6. A transmit device, comprising:
a processor, configured to scramble to-be-transmitted data to obtain scrambled data; and
a transceiver, configured to send the scrambled data to a receive device, wherein
initialization bits of a scrambler used to scramble the data comprise a first bit sequence and a second bit sequence, the first bit sequence is carried in a service field of the to-be-transmitted data, the second bit sequence reuses a bit in a signal field of a physical layer protocol data unit (PPDU), and a quantity of the initialization bits is equal to an order of the scrambler.

7. The transmit device according to claim 6, wherein the order of the scrambler corresponds to at least one of a resource unit size and a modulation and coding scheme.

8. The transmit device according to claim 6, wherein the second bit sequence reuses bits that are in the signal field and correspond to at least one type of indication information indicating a channel bandwidth, a modulation and coding scheme, an association identifier, or a basic service set.

9. The transmit device according to claim 8, wherein the first bit sequence is 7 bits and is carried in first 7 bits in the service field; and the first bit sequence is set to 0 before the data is scrambled.

10. The transmit device according to claim 9, wherein 9 bits in the service field other than the first 7 bits are set as parity check bits in the signal field.

* * * * *